United States Patent [19]
Keryvel et al.

[11] Patent Number: 5,249,301
[45] Date of Patent: Sep. 28, 1993

[54] PROCESSING COMMUNICATION SYSTEM HAVING A PLURALITY OF MEMORIES AND PROCESSORS COUPLED THROUGH AT LEAST ONE FEEDBACK SHIFT REGISTER PROVIDED FROM RING CONFIGURED INPUT STATIONS

[75] Inventors: Georges Keryvel, Versailles; Jean L. Thomas, Clement, both of France

[73] Assignee: Bull S.A, Paris, France

[21] Appl. No.: 12,974

[22] Filed: Feb. 2, 1993

Related U.S. Application Data

[63] Continuation of Ser. No. 426,940, Oct. 25, 1989, abandoned.

[30] Foreign Application Priority Data

Oct. 25, 1988 [FR] France .................... 88 13904

[51] Int. Cl.$^5$ .................... G06F 15/16; G06F 15/347
[52] U.S. Cl. .................... 395/800; 395/375; 395/425; 364/DIG. 1; 364/DIG. 2; 364/231.9; 364/232.2; 364/232.21; 364/931.01; 364/931.43; 364/931.4; 364/931.51
[58] Field of Search ............. 395/800, 325, 250, 375, 395/425

[56] References Cited
U.S. PATENT DOCUMENTS

| | | | |
|---|---|---|---|
| 3,735,362 | 5/1973 | Ashany et al. | 364/DIG. 1 |
| 4,334,305 | 6/1982 | Girardi | 370/86 |
| 4,855,903 | 8/1989 | Carleton et al. | 395/325 |
| 4,884,192 | 11/1989 | Terada et al. | 395/200 |
| 4,905,143 | 2/1990 | Takahashi et al. | 395/800 |
| 5,170,483 | 12/1992 | Keryvel et al. | 395/800 |
| 5,175,832 | 12/1992 | Keryvel et al. | 395/425 |

FOREIGN PATENT DOCUMENTS 0201088 12/1986 European Pat. Off.

OTHER PUBLICATIONS

Computer Architecture and Parallel Processing, Hwang et al. 1984.

Primary Examiner—Lawrence E. Anderson
Assistant Examiner—L. Donaghue
Attorney, Agent, or Firm—Weingarten, Schurgin, Gagnebin & Hayes

[57] ABSTRACT

The invention is in the realm of an information processing system including a central unit which includes several processors sending requests to several processors sending requests to several memories via an input interconnection and receiving responses from those memories via an output interconnection. To simplify the input interconnection when the number of processors and memories increases, a ring of stations equipped with a register is used. A request given by a processor is loaded into a station when that station is free or becomes free, If not the ring functions a fed back shift register. A station becomes free when the request contained in the station downstream is accepted by a memory. An analogous device can be used for the output interconnection. A notable application is vector processing.

19 Claims, 6 Drawing Sheets

PROCESSING COMMUNICATION SYSTEM HAVING A PLURALITY OF MEMORIES AND PROCESSORS COUPLED THROUGH AT LEAST ONE FEEDBACK SHIFT REGISTER PROVIDED FROM RING CONFIGURED INPUT STATIONS

This application is a continuation of application Ser. No. 07/426,940, filed Oct. 25, 1989, now abandoned.

BACKGROUND OF THE INVENTION

1. Field of the Invention

The present invention relates to information processing systems, particularly high performance systems using plural processors that can function simultaneously to execute a common program. The invention also relates particularly to a central processing unit architecture that can serve as the vector unit of a vector processor.

2. Background Discussion

To increase the performance of large scientific computers, the number of processors has had to be increased so that they can work simultaneously. This method, called "parallelization," theoretically makes it possible to achieve a total cycle time equal to the cycle time of a basic processor divided by the number of processors in the system.

Another way of cutting the cycle time is to use several basic processors organized in a "pipeline."

In reality, the performance of a vector processor also depends on the compiler's vectorization rate for a given application. This problem basically involves programming and compiling techniques and, consequently, goes beyond the bounds of this invention. In the following discussion, we shall therefore disregard this question and concern ourselves basically with the physical architecture.

The performance of a system also depends on the performance of the memories with which the processors communicate. The performance of a memory or a group of memories is defined by its access time and its cycle time. The access time is defined as the period of time between the sending of a request by one of the processors and the appearance of an acknowledgement signal indicating that the request has been retrieved by the memory and a new request can be sent. The cycle time defines the period of time between when a request is received by the memory and the time when the response is available in the memory's output register.

Current developments in the design of large computers have made it necessary to have memories with increasingly large capacities. However, the memories associated with the processors also have to have performances compatible with those of the processors. We are therefore trying to design memories with the shortest possible access and cycle time. For this, one standard solution is to use a memory made up of several modules and to have interleaved addressing of those modules. With this interleaving technique, successive or simultaneous requests sent by the processors are addressed successively or simultaneously to different modules in the memory.

Using the pipeline and interleaving techniques, the cycle times of the processors and the memories have been reduced.

To increase further the performance of the system in a vector mode, more parallelism of its function is being sought. For this, a number of pipeline type processors and a number of interleaved memories are used. However, the implementation of such a system takes into account the very low cycle time of the memories and the processors. One problem, in particular, is connecting the processors and the memories.

The solution of a bus shared by the processors and the memories prohibits simultaneous exchanges between several processors and several memories. The bus is thus not adapted for parallel functioning. The solution used most is to provide a crossbar-type interconnection network or derivative that makes those simultaneous connections possible. This solution is, however, limited by the increase in complexity of the interconnection device when the cycle time decreases and when the rate of parallelization increases. Indeed, a crossbar network implies a centralization of paths which has the following unfavorable effects:

increasing the connecting means, even more so when the paths are wide;

lengthening the connections when the size of the memories increases, with an unfavorable effect on thruputs and access times;

difficulty in integrating since the percentage of connection is high in relation to the associated logic functions;

need for centralized command management, which entails difficulties in the management of data flows and conflicts;

absence of modularity;

difficulty in using redundancies to permit reconfigurations.

SUMMARY OF THE INVENTION

The invention is aimed at overcoming the aforementioned drawbacks and, more particularly, at creating a device that ensures the same connection possibilities as a crossbar network and has the same peak thruput.

To reach this goal, according to the invention in its most general aspect, the exchanges between processors and memories are done, first of all, in message mode. Thus, to send a read or write command, each processor issues a request containing an address that identifies the memory concerned. On the other hand, the connection between the processors and the memories is designed with a ring of stations that can function as a fed-back shift register, each stage of which can store a request, and that request is accompanied by an indicator of validity. In addition, the output of each station is connected, directly or not, to the input interface of a memory. Lastly, each station can be accessed, under the control of a station control device, by requests sent by an associated processor.

Thus, when the requests are justified; that is, when each processor addresses its associated memory, the access of the requests is parallel and direct, as with a crossbar connection. On the other hand, for the other functioning modes, access to the shift register by the new requests sent from the processors is dependent on stages of the register being freed by the memories.

The proposed solution has decentralized control and a distributed physical installation that facilitates implementation and modularity. It also makes the reconfiguration possibilities more flexible.

To be more specific, the object of the invention is a central processing unit for a data-processing system with several processors connected to several memories, with the processors functioning as request transmitters while the memories function as receivers of the requests, and with the requests including command, address and, possibly, data information. A means of input interconnection is provided to transmit to the memories the requests from the processors. A means of output interconnection is provided to transmit to the processors the responses of the memories to these requests. The input interconnection means includes several parallel input interfaces, with each input interface providing a request acknowledgement signal for each request received showing acceptance by the input interface of the request received. The central unit is characterized by the fact that each request is associated with a request indicator whose logic value represents the validity of the associated request. The input interconnection means includes input stations each of which is associated with a processor and an input interface. Each station includes at least one register capable of storing a request and its associated request indicator, a primary access input to the register and an output connected to the output of the register. The stations are mounted in cascade, with the output of the last station connected to the primary input o the first station so as to form a ring of input stations that can function as a wrap around shift register. Each station includes a second input connected to the output of the associated processor. Each station includes a control device, one input of which receives the request indicator contained in the station located upstream and the second input of which, called the acknowledgement input, receives the acknowledgement signal coming from the associated interface to the station upstream, with the control device authorizing the transfer into the associated station register:

of either the request and its indicator contained in the station upstream when the request is valid and is not accepted by the interface associated with the station upstream, or of the request and its indicator which are available in the output of the processor associated with the station in the opposite case, and by the fact that the control device includes a notification output providing a notification signal to indicate to the associate processor which of these two requests is accepted.

Depending on the particular case, each parallel interface simply consists of the input interface of a memory.

Although this latter design is very simple, it favors justified operand calls in memories. A misregistration (absence of justification between processors and memories) will thus translate into a loss of thruput. Indeed, when the requests from the processors are justified (in registration), the first processor sends a request to the first memory, the second processor sends a request to the second memory, etc. If, on the other hand, the requests are off register, the first processor could, for example, send a request to the third memory, the second processor a request to the forth memory, etc. The result is that, in this particular case, the processors could not transmit for two clock cycles for each request accepted. Also, according to another aspect of the invention, the number of rings of stations is increased to raise the average thruput in the case of off register requests.

For this, the central unit is also characterized by the fact that the input interconnection device is made up of several rings of stations laid out in as many stages, with each ring of stations identical to the input ring of stations, and with the input ring of stations forming the first stage, the parallel input interfaces then being formed by the ring of stations of the second stage. For each memory a memory input interface provides a memory acknowledgement signal. Each station of the last stage has its output connected to the input interface of an associated memory and receives on its acknowledgement input the memory acknowledgement signal of the memory input interface connected to the station of the last stage which is located upstream from said station. Each station on another stage has its output connected to the second input of a station belonging to the stage directly above and receives on its acknowledgement input the notification signal sent from the station located upstream from said station belonging to said stage directly above.

According to this latter solution, it is noted that if the requests are off register by 2 as in the preceding example, the requests sent by the processors will always be blocked for two clock cycles but for a number of requests proportional to the number of rings of stations. The result is that the total thruput is improved.

Two special designs should be noted. The first is to use only two rings of stations, which has the advantage of simplifying the design. Another interesting design is to use a number of stations equal to the number of processors and memories. This solution promotes communication between each processor and its associated memory.

The preceding solves the problem of transmitting requests from the processors to the memories. When the memories have received the requests, they then transmit their response. This happens when the processors send read commands to the memories. The data read in the memories is transferred to the processors. The memories then play the role of transmitters of responses in the same way that the processors played the role of transmitters of requests Consequently, an interconnection device identical to one of those described previously for the requests could be used to transmit the responses.

Consequently, the invention also concerns a central unit characterized by the fact that the output interconnection device is identical to one of the input interconnection devices such as those previously defined, with the respective roles of the processors and the memories reversed, with the memories functioning as response transmitters, the processors functioning as response receivers and the responses accompanied by an indicator of the validity of the responses.

BRIEF DESCRIPTION OF THE DRAWINGS

Other characteristics and design details of the invention will be presented after the description related to the figures, where.

DESCRIPTION OF PREFERRED EMBODIMENTS

Figure 1:
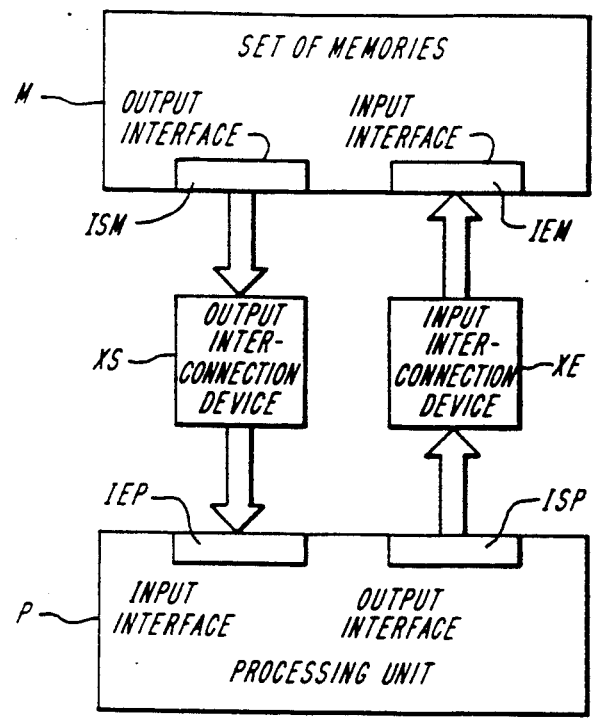
FIG. 1 shows schematically a central unit serving as an operating environment for the invention.

FIG. 1 shows the general schematic of a standard central unit that could serve as an operating environment for the invention.

The central unit includes a processing unit P generally consisting of several processors working in parallel, and each processor can be organized in a pipeline. The processing unit P communicates with a set of memories M. The set M can include several memories, usually called logic banks with independent access, and each logic bank can consist of a number of modules of interleaved physical banks.

According to the usual schematic, the processors simultaneously generate memory requests that are available in parallel in the output interfaces ISP of the processors. These requests are transferred to the input interfaces IEM of the memories via an input interconnection system XE, whose role is also to manage any conflicts that may arise.

Depending on the requests received, the set of memories M provides the corresponding responses in the output interfaces ISM. These responses are transmitted via an output interconnection device XS, to the input interfaces IEP of the processing unit P. The output interconnection device XS has a role that is totally symmetrical to the role of the input interconnection system XE.

Quite obviously, the unit P communicates with the outside via input-output units not shown.

The performance of such a system is maximum when the processing unit P sends to the memories justified requests, that is, when each request from an output interface is addressed to a preferred logic bank. However, this system must be able to function in any case whatsoever. As a result, there is the risk of conflict, for example, when several processors address themselves to the same logic bank. Consequently, the input interconnection device must be able to offer a path between any processor whatsoever and any logic bank whatsoever and to detect the conflict situations so it can manage or prevent them.

Clearly, identical problems arise with the output interconnection device XS.

In the systems known until now, the solution is to use as an interconnection device a crossbar type system implemented by means of several multiplexers and managed by associated logic. This solution, however, has limits that are linked to the rate of parallelization, the frequency with which requests and responses are issued, as well as the width of the data paths. In particular, the problem of managing conflicts becomes very difficult to resolve when the number of processors and memories is high. The following description will shown how the invention solves this problem.

Figure 2:
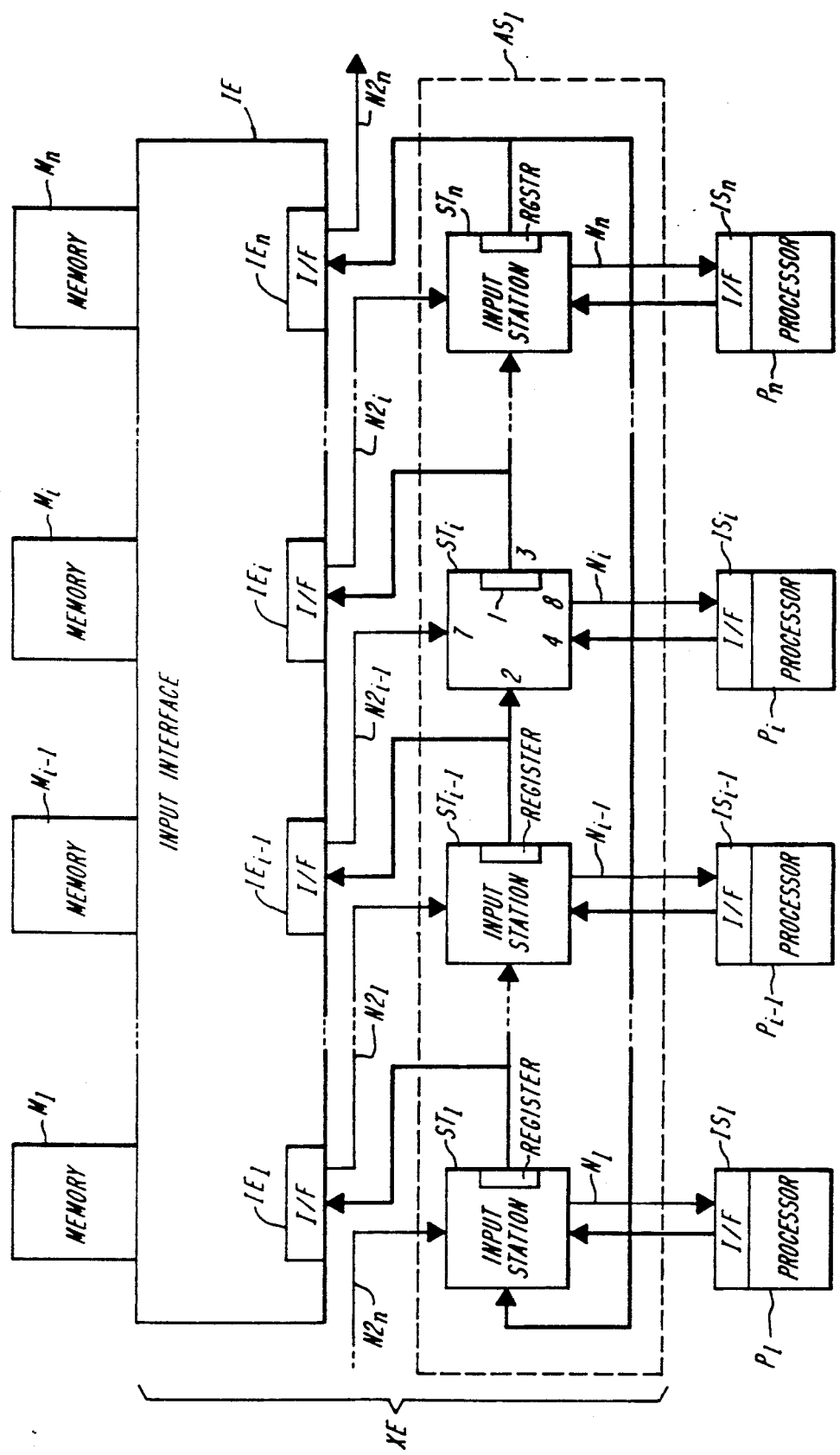
FIG. 2 shows a general design schematic for the invention.

In FIG. 2, n processors $P1,...P_{i-1}, P_i,...P_n$ form the processing unit P of FIG. 1. The set M of memories consists of n logic banks $M_1,...M_{i-1}, M_i,...M_n$. To simplify the rest of the explanation, the logic bank $M_i$ will simply be called "memory."

Each processor includes an output interface $IS_1,...IS_{i-1}, IS_i,...IS_n$. These interfaces $IS_i$ serve both as output buffers for available requests and as control devices for the processors and for the input interconnection device XE.

The input interconnection device XE includes an input interface IE composed of several parallel input interfaces $IE_1,...IE_{i-1}, E_i,...IE_n$. Each input interface $IE_i$ requests from the processors. When an interface $IE_i$ accepts a request present at its input, it provides an acknowledgement signal $N2_i$ to signal whether or not this request is accepted by the interface.

The input interconnection device XE also includes a set of input stations $ST_1,...ST_{i-1}, ST_i,...ST_n$. Each station $ST_i$ contains at least one register 1 capable of memorizing requests. Each station has a primary input 2 and an output 3 connected to the output of the register 1. These stations are mounted in cascade, with the output of the last station $ST_n$ connected to the first input of the first station $ST_1$ to allow the station registers to function as a fed back shift register, using a clock signal not shown. In the following, we will call the group of stations $ST_i$ "ring of stations" $AS_1$. The output 3 of each station $ST_i$ is also connected to an associated input interface $IE_i$. Each station $ST_i$ also includes a second input 4 connected to the output interface $IS_i$ of an associated processor $P_i$. Each station $ST_i$ is also equipped with a control device, no shown, that makes it possible to selectively put the input of the register 1 in communication with the first input 2 or the second input 4 of the station.

The output interfaces $IS_i$ and the input interfaces $IE_i$ are controlled by the clock signal already mentioned on the other hand, each request is accompanied by an indicator of validity B that can be provided by the processor making the request. The control device for each station $ST_i$ receives via an acknowledgement input 7 the acknowledgement signal $NS_{i-1}$ provided by the interface $IE_{i-1}$ downstream, as well as the indicator B contained in the station $ST_{i-1}$ downstream. Each station $ST_i$ includes, lastly, a notification output 8 connected to the output interface $IS_i$ of the associated processor.

The device in FIG. 2 works in the following way.

Starting first in the initial state, the requests contained in the registers are all assumed to be invalid. In other words, the indicator B associated with each request contained in the ring $AS_1$ has a first logic value indicating an invalid associated request.

When the system starts to work, each processor $P_{i-1}$ places a valid request in its output interface $IS_{i-1}$. The control device of the associated station $ST_{i-1}$ then detects that the request in the register upstream is not valid and authorizes the transfer of the request from the processor $P_{i-1}$ into the register of the station. At the following clock cycle, each register contains a valid request. The request in the station $ST_{i-1}$ appears at the input interface $IE_{i-1}$. If this request is really addressed to the interface, it gives an acknowledgement signal $N2_{i-1}$ with a first logic value signifying acceptance of the request by the interface. During this time, another request appears in the output interface of the processor $P_i$. The associated station $ST_i$ detects the indicator B of the request in the station $ST_{i-1}$ upstream. When the indicator signals a valid request, the station $ST_i$ is informed. But the station $ST_i$ receives the acknowledgement signal $N2_{i-1}$ from the interface $IE_{i-1}$ downstream indicating that that request will be accepted by the interface. The control device of the station $ST_i$ will thus authorize the transfer of the new request from the processor $P_i$ into its associated register.

The process previously described will continue as long as each processor $P_i$ addresses requests to its associated interface $IE_i$ and that interface accepts the requests. This is the situation in the favorable case where the requests are justified.

On the other hand, if one of the processors, $P_{i-1}$, for example, has sent an unregistered request, the register of the station $ST_{i-1}$ would contain a request that is not addressed to the interface $IE_{i-1}$. The acknowledgement signal $N2_{i-1}$ will then take another logic value corresponding to this situation. The station $ST_i$ downstream will retrieve it and inform the processor $P_i$ of this situation by a notification signal $N_i$ sent from the output 8 and given by the control device of the station $ST_i$. The notification signal $N_i$ will thus prohibit the processor $P_i$ from transmitting a new request at the following cycle. The request contained in the register of the station $ST_{i-1}$ will then be transferred into the register of the station $ST_i$.

Of course, if the request contained in the station $ST_{i-1}$ is invalid, the processor $P_i$ is authorized to issue a new request which will be registered in the station $ST_i$. This situation can occur especially in the case of functions in a non vector mode where certain processors are performing memory access while others are not working and are, consequently, continuously issuing invalid requests.

Figure 3:
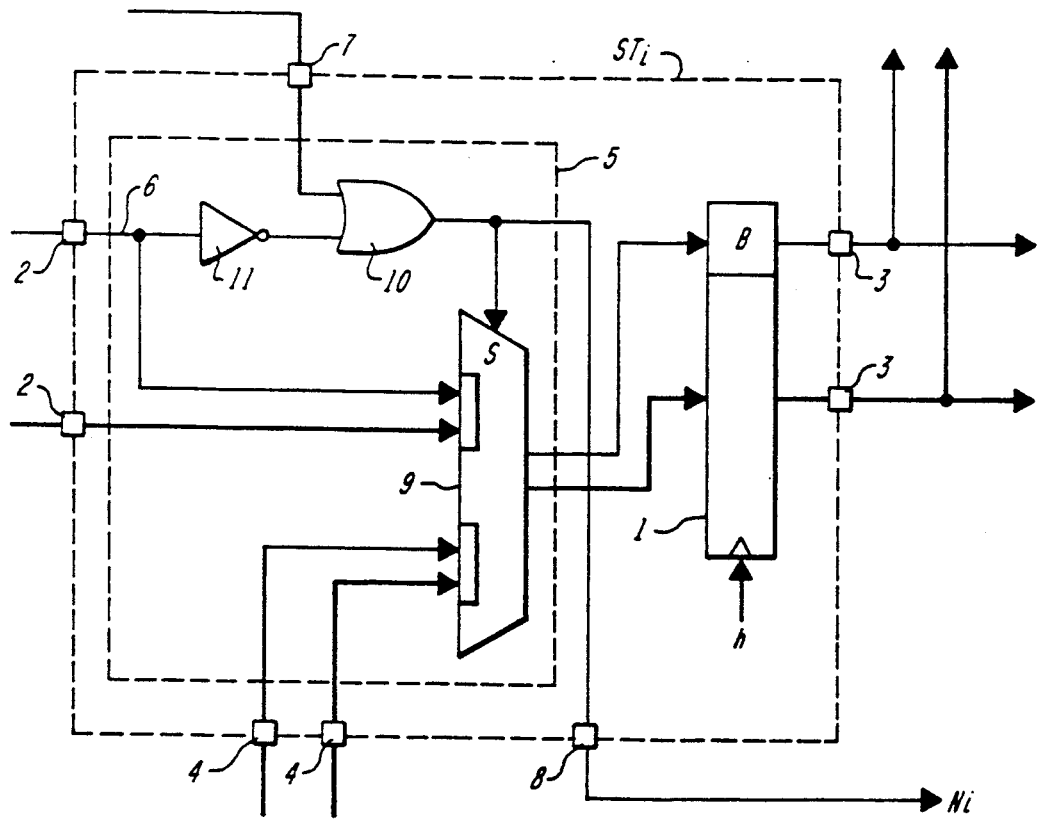
FIG. 3 shows the design mode of a station for the invention.

FIG. 3 shows an example of the design of the stations $ST_i$. The register 1 of the station $ST_i$ includes several flip flops controlled by the clock signal h. One of the flip-flops is assigned to the indicator B. The output of the register 1 forms the output 3 of the station The control device 5 includes a selection device like a multiplexer 9 and a control device formed by the logic circuits 10 and 11. The multiplexer 9 whose first input "0" is connected to the first input 2 of the station and whose second input "1" is connected to the second input 4 of the station. The multiplexer 9 is controlled by a binary selection signal S provided by the logic circuits 10 and 11. When the signal S takes the logic value 1, the multiplexer 9 puts the input 4 in communication with the input of the register 1. If S equals 0, the input 2 is put in communication with the input of the register 1.

In the example shown, we have also assumed that the indicated B is a binary element which, when it takes the logic value 1, indicates that the request is valid. When the indicator takes the logic value 0, the associated request is not valid. Taking this into account, the command device consists of a logic sense switch 11 whose input 6 receives the indicator B contained in the station downstream. The output of the sense switch is connected to a first input of an OR gate 10 whose second input is connected to the acknowledgement input 7 of the station. The OR gate 10 then gives the selection signal S described previously. This signal S is also applied to the notification output 8 of the station and will thus also form the notification signal $N_i$.

The simplest design mode for the device in FIG. 2 is to directly use the input interfaces of the memories as parallel input interfaces $IE_i$. This solution has the advantage of design simplicity but has the disadvantage of lowering throughput when the requests are misregistered. Indeed, with a misregistration d (included between 1 and n−1, each processor $P_i$ addresses itself not to its associated memory $M_i$ but to the memory $M_{i+d}$. After the first request is sent, the processors will be blocked for d cycle time before they can issue their next request. The result is a lowering of thruput that is even greater when the misregistration d is large.

According to he design variations of the invention, this problem can be solved by adding extra station rings.

Figure 4:
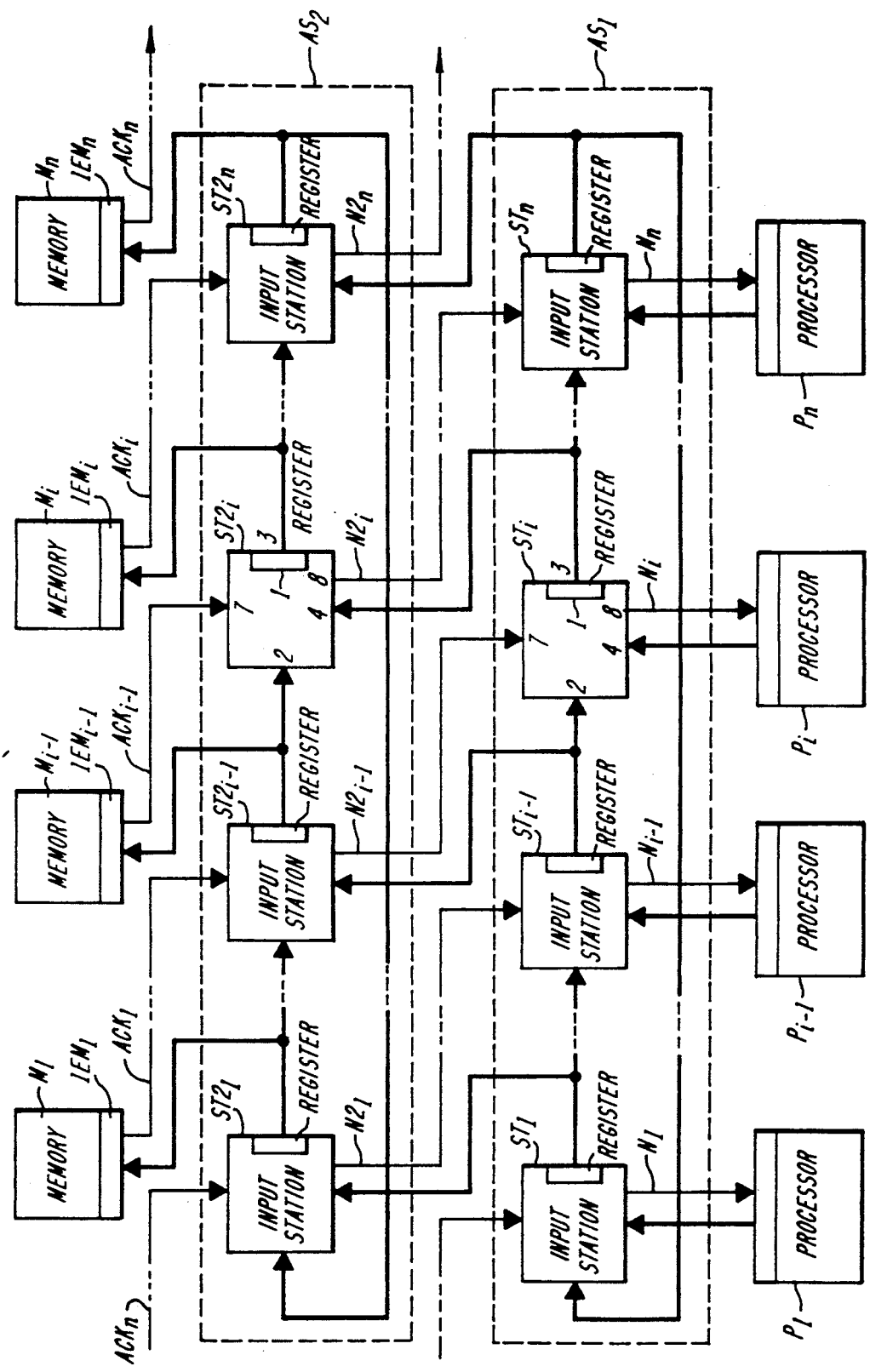
FIG. 4 shows a special design for the invention using two rings of input stations.

Referring now to FIG. 4, we shall describe for the first time a special case where only two rings of stations are used.

We have the processors $P_i$ and the memories $M_i$. The first ring $AS_1$ of stations is identical to the one described in FIG. 2 and the input interface IE is now implemented by a second ring $AS_2$ of stations identical to the first ring $AS_1$. Each station $ST_i$ of the first ring $AS_1$ has its output connected to the second input 4 of an approved station $ST2_i$ of the second ring $AS_2$. The acknowledgement input 7 of the station $ST_i$ receives the signal $N2_{i-1}$ of the station $ST2_{i-1}$ placed directly upstream from the approved station $ST2_i$. This signal $N2_{i-1}$ is sent by the notification output 8 of the station $ST2_{i-1}$.

The output 3 of each station $ST2_i$ of the second ring $AS_2$ is connected to the input interface $IEM_i$ of an associated memory $M_i$. The acknowledgement input 7 of the station $ST2_i$ is connected to the acknowledgement output $ACK_{i-1}$ of the memory $M_{i-1}$ located downstream.

The notification signal $N2_i$ coupled from station $ST2_i$ of the second ring $AS_2$ replaces the same identified acknowledgement signal coupled from interface $IE_i$ of FIG. 2. Moreover, the acknowledgement signal $ACK_{i-1}$ sent by the interface $IEM_{i-1}$ of a memory $M_{i-1}$ constitutes the acknowledgement signal for the station $ST2_i$ which is placed directly downstream from that memory and which belongs to the second ring $AS_2$.

The functioning of the device in FIG. 4 can easily be deduced from the one already described in reference to FIG. 2. The following is a brief summary of it:

each station accords absolute priority to the station upstream on the same ring;

if the station upstream is free, or if it becomes free (acceptance of the request by the associated memory or the associated station above), a transfer of a request into the station in question is made from the first ring or from a processor;

if a request presented to a memory is not addressed to it or if a request addressed to a Memory is presented to it when that memory is busy, that request remains on the ring and will be shown to the memory after a complete turn in the ring;

the indicator B accompanies each request and tells whether or not the station which contains it is free.

It should be noted that in this design, the output of the stations $ST_i$ is not simply connected to the input interface of a memory. The extra ring allows it to perform better in the case of misregistered requests. Indeed, initially this system authorizes the issuance of two misregistered successive requests for each processor. Next, the processors are blocked for d re registering cycles during which all requests contained in the stations shift from d stages to the right. Then, two new successive misregistered requests can be issued by the processors. The result is that the total thruput is improved since each re registering cycle causes the shifting of twice as many requests as in the case of just one ring.

Figure 5:
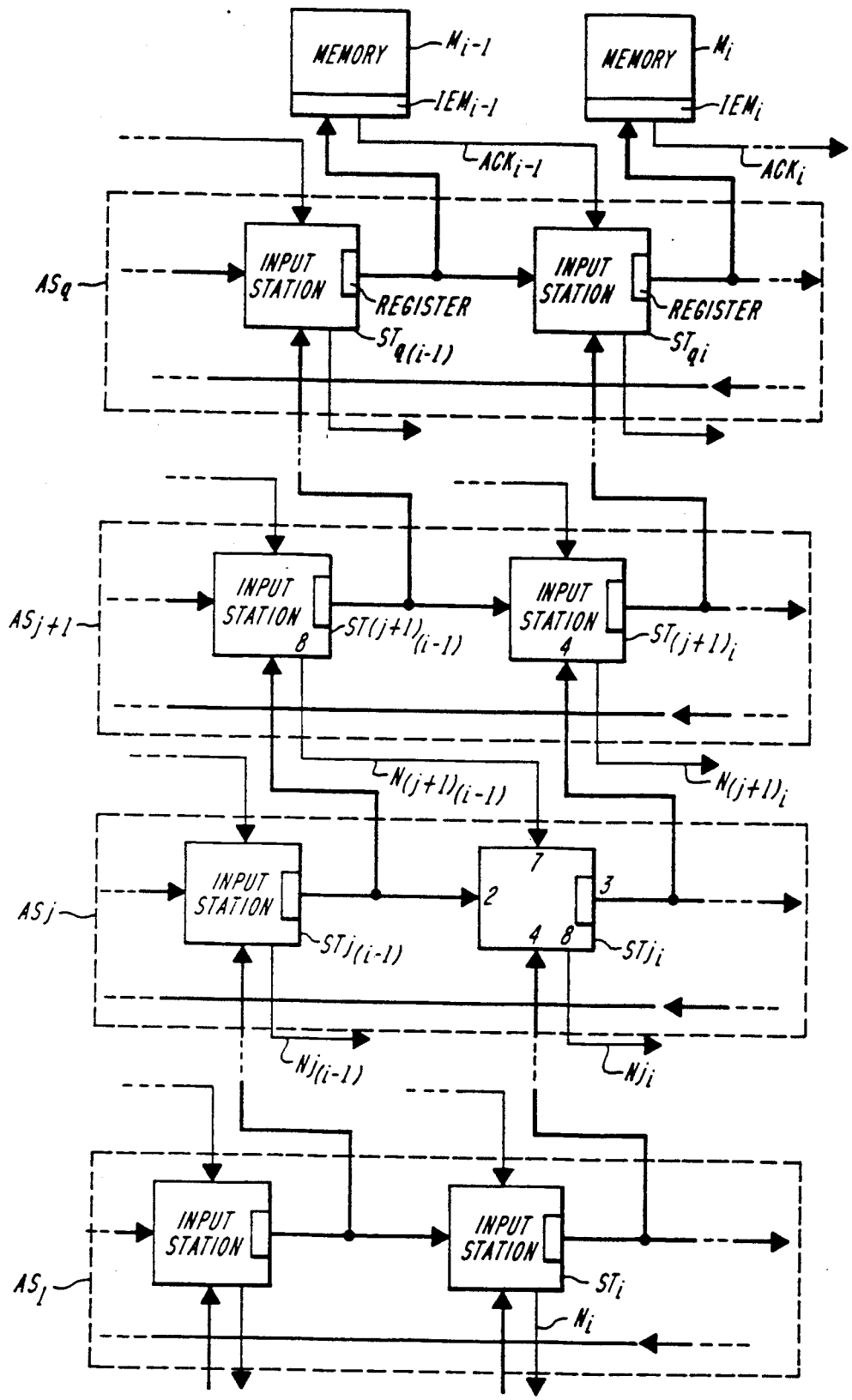
FIG. 5 shows part of a design mode using several rings of input stations.

Of course, thruput is improved even more if the number of rings is increased. FIG. 5 partially shows a design using q rings: $AS_1,...AS_j, AS_{j+1},...AS_q$. These rings are arranged in q stages, with the ring $AS_1$ of the first stage connected to the processors, while the ring $AS_1$ of the first stage is the same as before. The arrangement of the last ring $AS_q$ in relation to the memories is identical to that of the ring $AS_2$ in FIG. 4.

To facilitate the explanations in FIG. 5, the following notation has been used: each station $STj_i$ is identified by a double index $j_i$ where j is the stage to which the station belongs and i is the rank of the station in its ring $AS_j$.

Each station $STj_i$ of an intermediate stage j (j different from q) is associated with a station $(ST(j+1))_i$ of the same rank i and a higher stage j+1.

In the intermediate stage j, each station $STj_i$ has its output 3 connected to the input 4 of the associated station $ST(j+1)_i$ of the stage j+1 above. The station $STj_i$ receives at its acknowledgement input 7 the notification signal $(N_{j+1})$ $(i-1)$ from the notification output 8 of the station $ST(j+1)_{(i-1)}$ of the stage above j+1 located upstream.

The functioning of this device can be deduced from the figure and from the explanations already given in reference to FIGS. 2 and 4. However, it should be noted that in the case of misregistered requests, the processors will be blocked for d cycles from sending q successive requests by the processor We see thus that the peak thruput of this interconnection device increases with the number of stages. However, one cannot indefinitely increase this number, since each extra ring entails an increase in memory access time.

Up until now, we have been describing designs where the number n of processors is equal to the number of memories. However, the system could be adapted to cases where the numbers are different, provided that the number of stations of rings is equal to or greater than the largest of the two numbers of processors and memories. However, the cases where these numbers are equal allow optimum use of the interconnection device.

Attention should be drawn to the special case where the number q of stages is equal to the number n of processors and to the number of memories.

This solution especially promotes justified requests. One can indeed easily verify that any request from a processor $P_i$ accepted by its associated memory $M_i$ immediately triggers authorization of transmission by the same processor $P_i$.

Figure 6:
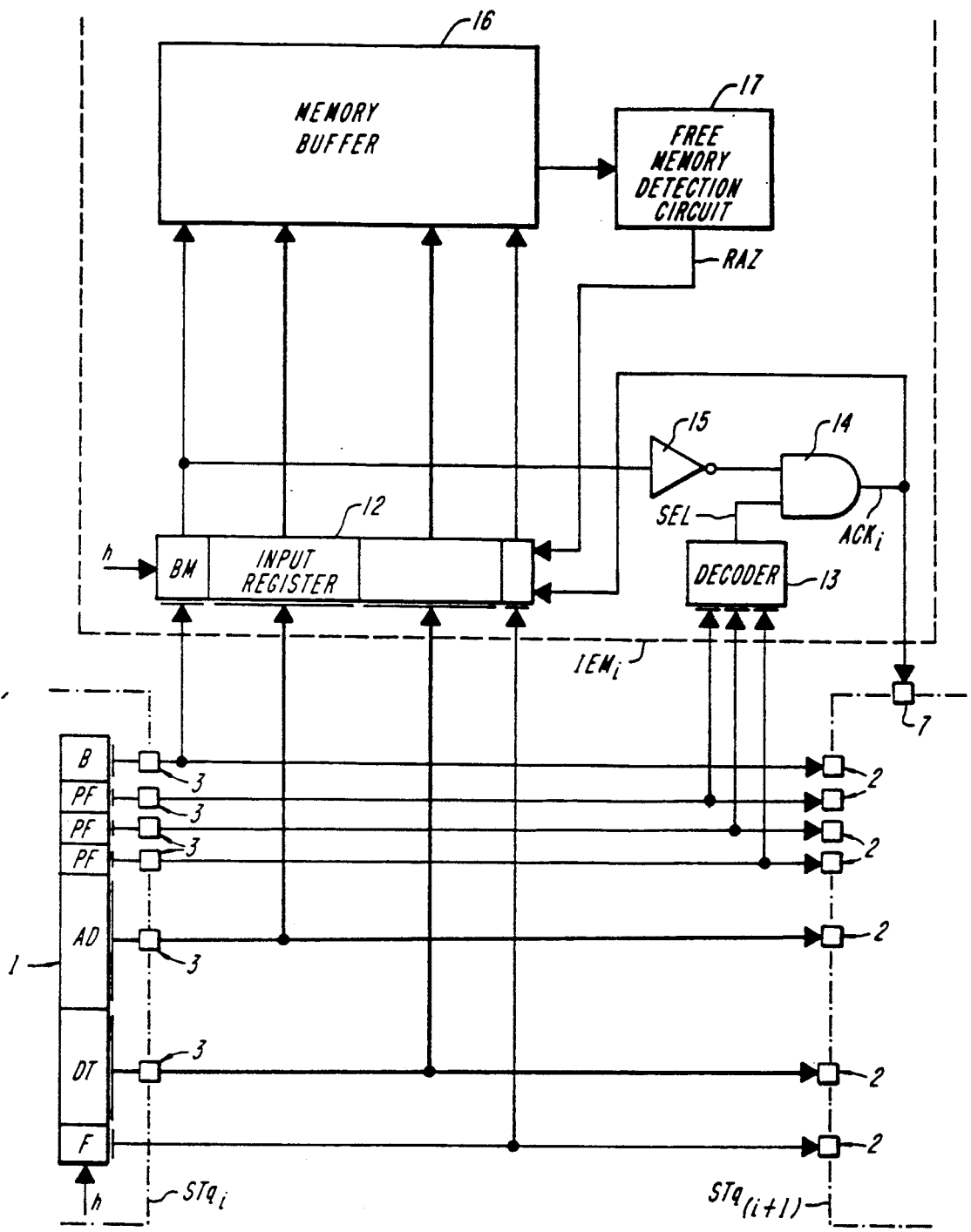
FIG. 6 shows a design detail of the input interface of a memory.

FIG. 6 shows in detail the connections between two neighboring stations $STq_i$, $STq_{(i+1)}$ of the last stage q with the input interface $IEM_i$ of the memory $M_i$ The register 1 of the station $STq_i$ consists of a first flip flop B assigned to the indicator of validity, one or more flip flops F corresponding to the code function associated with the request, several flip-flops DT to memorize a tag of origin or data, several flip flops AD to memorize the address associated with the request, flip flops PF represent the least significant bit of the address AD serving to identify the memory concerned with the address. The outputs of these flip flops form the output 3 of the station $STq_i$. These flip flops are controlled by the clock signal h.

The interface $IEM_i$ includes an input register 12 and a decoder 13 connected to the output 3. The decoder 13 receives the last significant bit of the address and provides a signal SEL providing the logic value 1 when the least significant bits (flip flops PF) received coincides with the identity of the memory $M_i$. The input register 12 receives the rest of the request in the register 1. The flip-flop BM of the register 12 is assigned to the indicator B. The output of the flip flop BM is applied to the input of a sense switch 15, whose output is connected to a first input of an AND gate 14. The second input of the gate 14 receives the signal SEL from the decoder 13.

The AND gate 14 gives the acknowledgement signal $ACK_i$ from the memory $M_i$. The signal $ACK_i$ is applied to the acknowledgement input 7 of the station $STq_{(i+1)}$ placed downstream from the station $STq_i$. Because of this interface circuit, the signal $ACK_i$ takes the logic value 1 when the register 12 is available (BM=0) when the request is indeed addressed to the memory $M_i$ (SEL=1).

The register 12 is a standard type, including parallel inputs and outputs, a clock input, a loading command input and a resetting input.

The register 12 receives the clock signal h on it clock input and the signal $ACK_i$ on its loading command input. Its reset input receives the signal RAZ from a free memory detection circuit 17. The output of the register 12 communicates with the input of the memory.

The interface circuit works in the following way. When the memory becomes free, the circuit 17 forces the signal RAZ to a logic value that resets the register 12. If a request contained in the register 1 is addressed to the memory, the output signal SEL of the decoder 13 takes the value 1. Since BM equals 0, the output of the sense switch 15 takes the value 1. The result is that $ACK_i$ equals 1. The register 12 is thus authorized to load at the following clock pulse. After the request is loaded, as long as the signal RAZ has not reappeared, BM keeps the value of the indicator B. If B equals 0, a new request could be loaded at the following cycle, without waiting for reset. If, on the other hand, B equals 1, subsequent requests could be retrieved only after the appearance of the RAZ signal.

We have shown in the preceding that the invention's interconnection makes it possible to solve the problem of misregistered requests with a lowering of performance, which can be limited by increasing the number of rings. Another case of lowering thruput in the interconnection device involves the problem of saturation of the rings and memory conflicts.

To fix this problem, according to an added feature of the invention, the input interface $IEM_i$ of each memory has a memory buffer 16 of the "First In First Out" type (FIFO) which makes it possible to absorb the requests in the memory when requests too close together are addressed to the same physical bank. Saturation of the rings will be avoided. A buffer of this type could also be provided in the output of the memories so that saturation at the responses stage does not cause saturation of the input rings. The FIFO-type buffers themselves are well known, so a detailed description of them is unnecessary. However, it could be noted that the circuit 17 gives the signal RAZ as a function of signal indicting whether or not the buffer 16 is saturated.

Given that the output interconnection device plays a role symmetrical to that of input, the solutions described previously could be transposed to the output interconnection device. The responses of the memories will be accompanied by a validity indicator f the responses $B_r$. These responses will be transported by response rings composed of the same elements as the request rings previously described.

We have seen that the input stations of a request ring can function as a shift register. Each ring thus defines a traffic path for the requests and, by agreement, this path corresponds to the sequence of the indexes i of the processors $P_i$ and the memories $M_i$.

Once this agreement has been established, several arrangements are possible as regards the response rings.

A first possibility is to use the same arrangement as for the request rings. If we assume, to keep things simple, that the input interconnection includes the same number q of stages as the output interconnection, then for the justified requests we see the minimum number of stages crossed by the requests or by the responses is equal to q. Now, the cycle time for a memory access is equal to the sum of the cycle time of the memory plus a transmission time of a request to the memory and the response to the processor that made the request.

With justified requests, if there is no saturation, the transmission time is thus proportional to 2q.

In the case of a misregistered request with the value d between 1 and n−1, the number of input stages to be crossed is equal to q+d. The number of output stages is equal to q+(n−d). The number of output stages is equal to q+(n−d). Thus, there is a total of n+2q stages to cross.

With this solution, the transmission time, thus the cycle time for a misregistered memory access is independent of them misregistration. This property can be advantageous when one wishes the arrival order of the responses to be the same as that of the requests in the case of a misregistration that is not zero. On the other hand, registered (justified) requests are favored in cycle time.

According to one version, the shortest path (q stages) is no longer to connect the output of a memory $M_i$ to its associated processor $P_i$ but to connect it to the index processor $P_{i+1}$ above. In this case, the number of output stages to be crossed is equal to n−1−d.

The total transmission time is thus proportional to n−1, whatever the misregistration d between 0 and n−1. Here we see the advantage of the first solution, which also applies to registered (justified) requests.

In another solution, the traffic direction of the responses is reversed, that is, ascending order for the memories and descending order for the processors. In this case, the number of output stages to be crossed is equal to 2q for the registered requests, if the shortest path is chosen to connect the output of a memory $M_i$ with its associated processor $P_i$. On the other hand, with a misregistration d, the number of output stages to be crossed is equal to d+q. total transmission time is thus proportional to 2d+2q.

This last solution thus permits a lower cycle time compared to the preceding solutions in cases where the misregistration is low (less than n/2), which is the most frequent in practice.

Because of the similarity between the input interconnection device and the output one the latter need not be described further.

Figure 7:
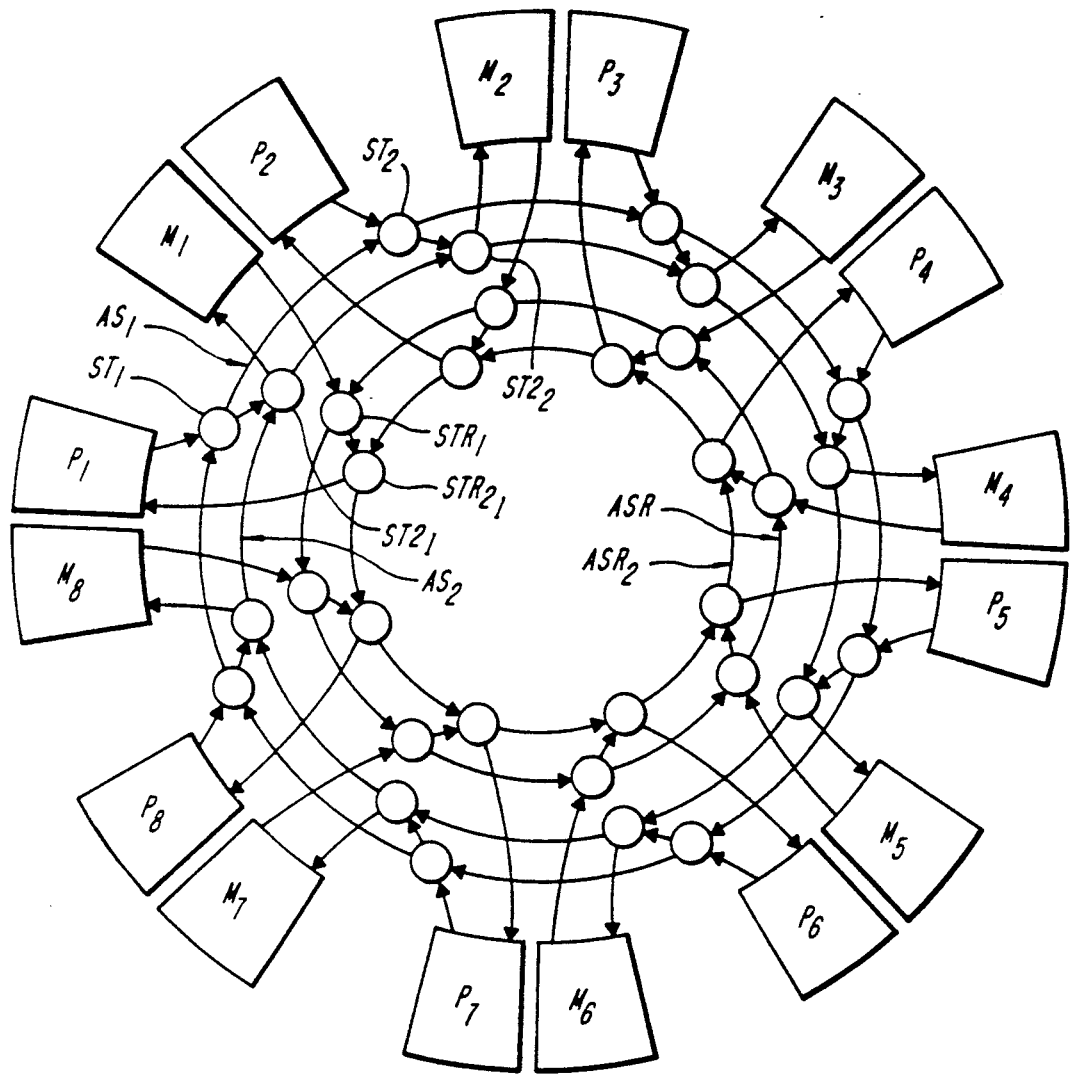
FIG. 7 shows an overall schematic of the central unit in the invention in a particular case.

FIG. 7 shows an example of a complete design of a central unit according to the invention in a case where the input and output interconnection devices each have two rings. We find in this figure the elements already described previously, with the same references. The traffic direction of the responses is opposite that of the requests.

In the example described, there are eight processors plus eight memories. If one takes, for example, the processor $P_1$, it transmits its requests via the station $ST_1$ of the ring $AS_1$. If the station $ST2_1$ of the second ring is available, the request in the station $ST_1$ is transmitted at the following cycle to $ST2_1$. In the opposite case, the request is transmitted to the station $ST_2$ downstream from the first ring.

If a request in the station $ST2_1$ is accepted by the memory $M_1$, the station $ST2_2$ becomes free. When a response is available in the output interface of the memory $M_1$, if the station $STR_1$ of the first response ring $ASR_1$ is available, the request is transferred in the next cycle to the station $STR2_1$ which gives it to the input interface of the processors $P_1$.

FIG. 7 also shows an arrangement of processor and memories that facilitates the connectors. This example also illustrates the modular nature of the designs made possible by the invention.

We claim:

1. A central unit for a data-processing unit comprising:
   a plurality of processors with each of said processors having an input interface and an output interface wherein each of said processors are adapted for transmitting a request signal said, request signal comprising at least one of:
      (a) a command signal;
      (b) an address signal; and
      (c) data information;
   a plurality of memories each of said memories having an input interface and an output interface wherein each of said memories is adapted for receiving the request signal from said processors and for transmitting a response signal in response to said request signal;
   an input interconnection device, coupled between the input interface of said memories and the output interface of said processors, said input interconnection device provided to transmit the request signal from the output interface of each of said processors to the input interface of each of said memories;
   an output interconnection device, coupled between the output interface of said memories and the input interface of said processors, said output interconnection device provided to transmit the response signal from the output interface of said memories to the input interface of said processors; wherein said input interconnection device comprises:
   a plurality of parallel input interfaces, each one of said plurality of input interfaces for providing each request signal fed thereto with a corresponding request acknowledgement signal said request acknowledgement signal for indicating at least one of said input interfaces accepts said request signal;
   a plurality of input stations each of said input stations having a primary access input, a secondary input, and an output wherein the secondary input is coupled to the output interface of a corresponding one of said plurality of processors and the output is coupled to a corresponding one of said input interfaces with each of said input stations comprising:
      at least one register for storing a request signal and the corresponding request indicator, the at least one register having an input coupled to the primary access input and to the secondary input and an output of said register coupled to the output of said input station;
   wherein each of said stations are coupled to each other with the output of each of said input stations being coupled to the primary access input of a different one of said input stations and with the output of a last input stations connected to the primary access input of a first input stations so as to form a first ring of input stations that can function as a feedback shift register;
   wherein each of said input stations comprises:
      a control device wherein a first input of said control device receives the request indicator contained in the input stations located upstream and wherein a second input of said control device receives the acknowledgement signal from the interface of said input station upstream, and wherein the control device authorizes a transfer into the register of the corresponding station a first one of the group comprising:
(i) the request and its indicator contained in the station upstream when said request is valid and has not been accepted by the interface corresponding to said station upstream; and
(ii) the request and its indicator which are available in the output of the processor corresponding to said station when the request contained in the station upstream is valid and has been accepted by the interface corresponding to said station upstream; and
(iii) the request and its indicator which are available in the output of the processor corresponding to said station when the request contained in the station upstream is not valid;
wherein said control device includes a notification output port coupled to the output interface of the corresponding processor, wherein said control device provides a notification signal to indicate to the corresponding processor which of those two requests is accepted; and
wherein each of said plurality of processors provides each request signal with a corresponding request indicator having a logic value which indicates the validity of the request signal.

2. A central unit according to claim 1, wherein each one of the parallel interfaces of the input interconnection device correspond to one of the input interfaces of the memories.

3. A central unit according to claim 2, further comprising:
a clock for synchronizing the registers in said input stations wherein each processor issues an invalid request at each clock cycle when said processor has no request to issue.

4. A central unit according to claim 1, wherein each of said parallel interfaces comprise:
a second ring of input stations with each of said parallel interfaces comprising the second input of one of said second ring of input stations;
said acknowledgement signal being made up of the notification signal of said second ring of input stations; and
wherein each output of said second ring of input stations is connected directly to the input interface of the corresponding memory.

5. A central unit according to claim 4, further comprising:
a clock for synchronizing the registers in said input stations wherein each processor issues an invalid request at each clock cycle when said processor has no request to issue.

6. A central unit according to claim 1, wherein:
said input interconnection device comprises a plurality of ring of stations each of said ring of stations disposed to provide a corresponding number of stages;
each of said ring of stations is substantially identical to said input station ring;
said input station ring forming a first stage;
said parallel input interface then being formed by the station ring of a second stage;
each memory and input memory interface provides a memory acknowledgement signal;
each station of the last stage has its output connected to the input interface a corresponding memory and receives at its acknowledgement input the memory acknowledgement signal of the input memory interface, which is connected to the station of said last stage and which is located upstream from said station; and
each station of another stage has its output connected to the second input of a station belonging to the stage directly above and receives at its acknowledgement input the notification stage from the station located upstream from said station belonging to said stage directly above.

7. A central unit according to claim 6, further comprising:
a clock for synchronizing the registers in said input stations wherein each processor issues an invalid request at each cock cycle when said processor has no request to issue.

8. A central unit according to claim 6, wherein the numbers of stages, processors and memories are identical.

9. A central unit according to claim 8, further comprising:
a clock for synchronizing the registers in said input stations wherein each processor issues an invalid request at each cock cycle when said processor has no request to issue.

10. A central unit according to claim 1 further comprising:
a clock for synchronizing the registers in said input stations wherein each processor issues an invalid request at each cock cycle when said processor has no request to issue.

11. A central unit according to claim 1, wherein the control device of at least one station comprises:
a selection device, said selection device having first and second inputs and an output, said output connected to the input of the register of the station and said first and second inputs of said selection device coupled to said first and second inputs of the station; and
a command device having first and second inputs, with the first input receiving the request indicator contained in the station downstream and the second input forming said acknowledgement input of the station, with said command device providing a selection signal to control said selection device so as to put the input of said register in communication with a first one of the first and second inputs, and with said selection signal also being transmitted to said notification output of the station.

12. A central unit according to claim 1, wherein:
each of the plurality of memories are adapted to transmit response signals, said response signals accompanied by a response validity indicator;
each of the plurality of processors are adapted to receive said responses; and
said output interconnection device comprises:
a plurality of parallel input interfaces, each of said input interfaces coupled to a corresponding one of said plurality of processors, each one of said plurality of input interfaces for providing each request signal fed thereto with a corresponding request acknowledgement signal said request acknowledgement signal for indicating at least one of said input interfaces accepts said request signal;

a plurality of input stations each of said input stations having a primary access input, a secondary input, and an output wherein the secondary input is coupled to the output interface of a corresponding one of said plurality of memories and the output is coupled to a corresponding one of said input interfaces with each of said input stations comprising:

at least one register for storing a request signal and the corresponding request indicator, the at least one register having an input coupled to the primary access input and to the secondary input and an output of said register coupled to the output of said input station;

wherein each of said stations are coupled to each other with the output of each of said input stations being coupled to the primary access input of a different one of said input stations and with the output of a last input station connected to the primary access input of a first input station so as to form a first ring of input stations that can function as a feedback shift register;

wherein each of said input stations comprises:

a control device wherein a first input of said control device receives the request indicator contained in the input station located upstream and wherein a second input of said control device receives the acknowledgement signal from the interface of said input stations upstream, and wherein the control device authorizes a transfer into the register of the corresponding station a first one of the group comprising:

(i) the request and its indicator contained in the station upstream when said request is valid and has not been accepted by the interface corresponding to said station upstream; and (ii) the request and its indicator which are available in the output of the processor corresponding to said station when the request contained in the station upstream is valid and has been accepted by the interface corresponding to said station upstream; and (iii) the request and its indicator which are available in the output of the processor corresponding to said station when the request contained in the station upstream is not valid;

wherein said control device includes a notification output port coupled to the output interface of the corresponding memory, wherein said control device provides a notification signal to indicate to the corresponding memory which of those two requests is accepted.

13. A central unit according to claim 12, wherein:
the input stations ring defines a traffic direction for the requests in relation to the processors and the memories; and
said output interconnection device comprised of at least one response ring, with each ring arranged so that the traffic direction of the responses is the same as the traffic direction of the requests.

14. A central unit according to claim 12, wherein:
the input stations ring defines a traffic direction for the requests in relation to the processors and the memories; and
said output interconnection device comprised of at least one response ring, wherein said input stations ring and the at least one response said are arranged such that the traffic direction of the responses are reversed in relation to the traffic direction of the requests.

15. A central unit according to claim 1, wherein each memory is comprised of a number of interlaced memory banks.

16. A central unit according to claim 1, wherein the input interface of each memory includes a First In-First Out type memory buffer.

17. A central unit according to claim 1, wherein each processor comprises a plurality of basic processors that can function in a pipeline mode.

18. A central unit according to claim 17, wherein:
each of the request signals includes a function code that defines the operation to be performed in one of the memories, said function code corresponding to a first one of:
(a) address information;
(b) data in the case of a write; and
(c) a tag or origin in the case of a read, with said tag of origin identifying the basic processor that sends the request; and
each of the response signals include a destination tag corresponding to the tag of origin for a corresponding one of the request signals wherein said destination tag corresponds to a first one of:
(a) data in the case of a read; or
(b) an error report.

19. An interconnection device for coupling a plurality of processors to a plurality of memories, said interconnection device comprising:

a plurality of parallel input interfaces, each of said input interfaces coupled to a corresponding one of said plurality of memory modules, each one of said plurality of input interfaces for receiving a request signal from a corresponding one of said processors and for providing each request signal fed thereto with a corresponding request acknowledgement signal, said request acknowledgement signal for indicating at least one of said input interfaces accepts said request signal;

a plurality of input stations each of said input stations having a primary access input, a secondary input, and an output wherein the secondary input is coupled to an output interface of a corresponding one of said plurality of processors and the output is coupled to a corresponding one of said input interfaces with each of said input stations comprising:

at least one register for storing a request signal and the corresponding request indicator, the at least one register having an input coupled to the primary access input and to the secondary input and an output of said register coupled to the output of said input station; and a control device, wherein a first input of said control device receives the request indicator contained in an input station located upstream and wherein a second input of said control device receives the acknowledgement signal from the interface of said input station upstream, and wherein the control device authorizes a transfer into the register of the corresponding station a first one of the group comprising:

(i) the request and its indicator contained in the station upstream when said request is valid and has not been accepted by the interface corresponding to said station upstream; and
(ii) the request and its indicator which are available in the output of the processor corresponding to said station when the request contained in the station upstream is valid and has been accepted by the interface corresponding to said station upstream; and
   (iii) the request and its indicator which are available in the output of the processor corresponding to said station when the request contained in the station upstream is not valid; and wherein said control device includes a notification output port coupled to the output interface of the corresponding memory, wherein said control device provides a notification signal to indicate to the corresponding processor which of those two requests is accepted; and wherein each of said input stations are coupled to each other with the output of each of said input stations being coupled to the primary access input of a different one of said input stations and with the output of a last input station connected to the primary access input of a first input station so as to form a first ring of input stations that can function as a feedback shift register.

* * * * *

UNITED STATES PATENT AND TRADEMARK OFFICE
CERTIFICATE OF CORRECTION

PATENT NO. : 5,249,301
DATED : September 28, 1993
INVENTOR(S) : Georges Keryvel, et al Page 1 of 4

It is certified that error appears in the above-indentified patent and that said Letters Patent is hereby corrected as shown below:

On page 1 of the issued patent on the line identified as [75], after Inventors:, "Clement" should read --Clamart--.

Column 3, line 22, "o the" should read --of the--.

Column 6, line 16, "ST; "ring of stations" should read -- $ST_i$ a "ring of stations"--.

Column 6, line 47, "register of" should read --register 1 of--.

Column 7, line 20, "non vector" should read --non-vector--.

Column 7, line 25, "flip flops" should read --flip-flops--.

UNITED STATES PATENT AND TRADEMARK OFFICE
CERTIFICATE OF CORRECTION

PATENT NO. : 5,249,301
DATED : September 28, 1993
INVENTOR(S) : Georges Keryvel, et al It is certified that error appears in the above-indentified patent and that said Letters Patent is hereby corrected as shown below:

Column 7, line 31, "The multiplexor 9" should read --The input of the register 1 is connected to the output of the multiplexor 9--.

Column 8, line 52, "re registering" should read --re-registering--.

Column 8, line 57, "re registering" should read --re-registering--.

Column 9, line 18, "processor We" should read --processor. We--.

Column 9, line 42, "flip flop" should read --flip-flop--.

Column 9, line 43-44, "flip flops" should read --flip-flops--.

Column 9, line 46, "flip flops" should read --flip-flops--.

Column 9, line 47, "flip flops" should read --flip-flops--.

Column 9, line 50, "flip flops" should read --flip-flops--.

Column 9, line 51, "flip flops" should read --flip-flops--.

Column 9, line 57, "(flip flops PF)" should read --(flip-flops PF).

UNITED STATES PATENT AND TRADEMARK OFFICE
CERTIFICATE OF CORRECTION

PATENT NO. : 5,249,301
DATED : September 28, 1993
INVENTOR(S) : Georges Keryvel, et al It is certified that error appears in the above-indentified patent and that said Letters Patent is hereby corrected as shown below:

Column 9, line 61, "flip flop BM" should read --flip-flop BM--.

Column 12, line 60, "stations" should read --station--.

Column 12, line 61, "stations" should read --station--.

Column 12, line 67, "stations" should read --station--.

Column 15, line 30, "stations" should read --station--.

Column 15, line 50, "valid;" should read --valid; and--.

UNITED STATES PATENT AND TRADEMARK OFFICE
CERTIFICATE OF CORRECTION

PATENT NO. : 5,249,301
DATED : September 28, 1993
INVENTOR(S) : Georges Keryvel, et al It is certified that error appears in the above-indentified patent and that said Letters Patent is hereby corrected as shown below:

Column 15, line 58, "stations" should read --station--.

Column 15, line 66, "stations" should read --station--.

Column 16, line 2, "stations" should read --station--.

Column 18, line 3, "memory" should read --processor--.

Signed and Sealed this

Twenty-seventh Day of September, 1994

Attest:

BRUCE LEHMAN

Attesting Officer          Commissioner of Patents and Trademarks